United States Patent
Kiss

(10) Patent No.: US 7,101,425 B2
(45) Date of Patent: Sep. 5, 2006

(54) WASHER AND METHOD FOR PURIFYING GASES

(75) Inventor: Günter H. Kiss, Triesen (LI)

(73) Assignee: Thermoselect AG, Vaduz (LU)

( * ) Notice: Subject to any disclaimer, the term of this patent is extended or adjusted under 35 U.S.C. 154(b) by 20 days.

(21) Appl. No.: 10/474,109

(22) PCT Filed: Mar. 5, 2002

(86) PCT No.: PCT/EP02/02394

§ 371 (c)(1),
(2), (4) Date: May 26, 2004

(87) PCT Pub. No.: WO02/083271

PCT Pub. Date: Oct. 24, 2002

(65) Prior Publication Data

US 2004/0194622 A1    Oct. 7, 2004

(30) Foreign Application Priority Data

Apr. 10, 2001  (DE) ................................. 101 18 961

(51) Int. Cl.
*B01D 47/12* (2006.01)
*B01D 47/14* (2006.01)
*B01D 53/18* (2006.01)

(52) U.S. Cl. ............................. 96/300; 96/360; 261/98

(58) Field of Classification Search .................. 96/243, 96/290, 300, 356, 360, 275, 323; 95/149, 95/211, 224, 216, 217; 261/98, DIG. 54
See application file for complete search history.

(56) References Cited

U.S. PATENT DOCUMENTS

| | | | | |
|---|---|---|---|---|
| 3,556,490 A | * | 1/1971 | Bockman | 261/98 |
| 3,793,809 A | * | 2/1974 | Tomany et al. | 95/211 |
| 3,856,487 A | * | 12/1974 | Perez | 96/240 |
| 3,944,401 A | * | 3/1976 | Dorr et al. | 95/201 |
| 4,050,912 A | * | 9/1977 | Hemsath et al. | 96/273 |
| 4,200,616 A | | 4/1980 | Johansen | |
| 4,738,695 A | * | 4/1988 | Carr et al. | 95/187 |
| 5,041,274 A | * | 8/1991 | Kagi, Sr. | 423/243.06 |
| 5,122,169 A | * | 6/1992 | Schumacher et al. | 96/242 |
| 5,648,048 A | | 7/1997 | Kuroda et al. | |

FOREIGN PATENT DOCUMENTS

WO      WO 98 01214 A      1/1998

OTHER PUBLICATIONS

Database WPI, Section Ch., Week 199230, Derwent Publications Ltd., London, XP02204806, published Sep. 7, 1991.
Patent Abstract of Japan, vol. 1998, No. 10, dated Aug. 31, 1998.
JP 10 113534 A (Mitsubishi Heavy Ind. Lt.) dated May 6, 1998.
PCT International Search Report dated Jul. 17, 2002.

* cited by examiner

*Primary Examiner*—Frank M. Lawrence
(74) *Attorney, Agent, or Firm*—Howard & Howard

(57) ABSTRACT

In a washer for cleaning gases that contain particulate and/or gaseous impurities, the gases are conveyed through an absorption column that is sprayed with washing fluid. An additionally provided jet pump (7) operates with the washing fluid, wherein said jet pump is arranged in the gas flow serially with the absorption column and generates a negative pressure. The jet pump is preferably arranged in the gas flow upstream of the absorption column. The negative pressure generated in the gas flow by the jet pump should be at least so high that it compensates the pressure loss in the absorption column.

11 Claims, 1 Drawing Sheet

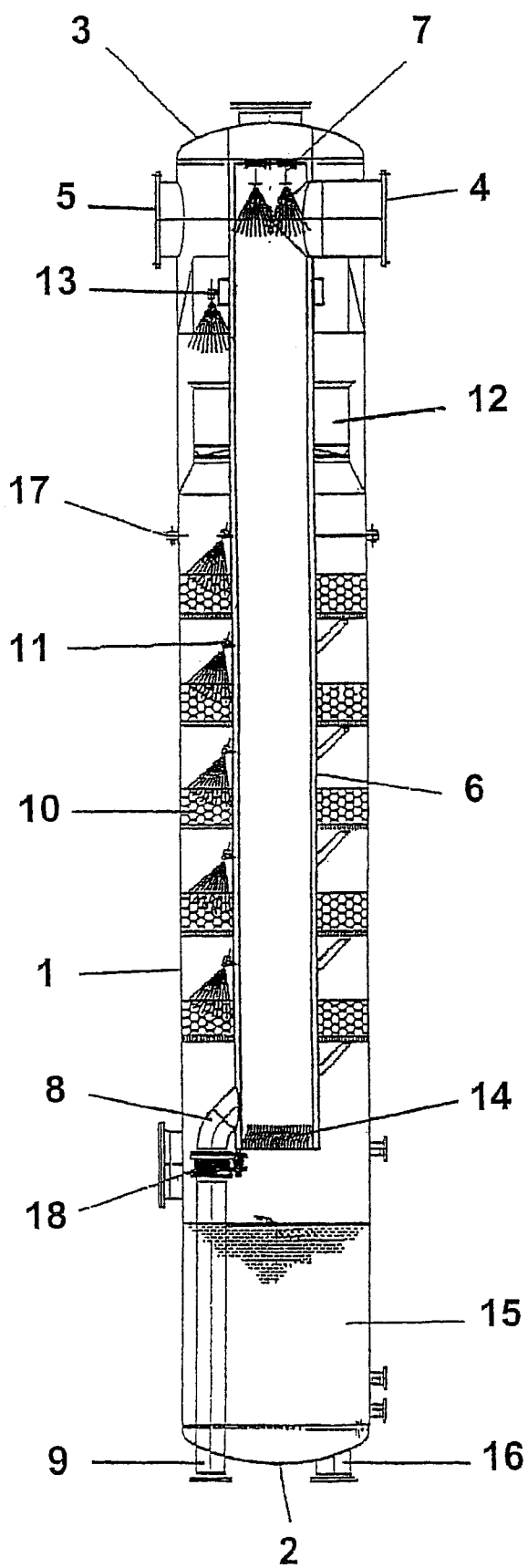

WASHER AND METHOD FOR PURIFYING GASES

BACKGROUND OF THE INVENTION

1. Field of the Invention

The invention pertains to a scrubber and to a method for cleaning gases according to the subject invention.

2. Description of the Prior Art

Conventional scrubbers for cleaning gases that contain particulate and/or gaseous impurities normally comprise so-called absorption columns with packings or contact bodies that are sprayed with a washing fluid. In these absorption columns, an intimate contact is produced between the washing fluid and the gases. This leads to a highly efficient absorption of the gaseous impurities. The washing fluid may consist of water such that only an absorption takes place; however, the washing fluid may also contain reactants that convert the gaseous impurities, for example, hydrogen sulfide, sulfur dioxide, nitrogen oxides or ammonia, into environmentally compatible substances. These absorption columns are usually equipped with ordered or unordered packings that are arranged in individual sections on support grates. Fluid distributors are arranged on the head section of these columns in order to ensure a uniform spraying with the washing fluid. These fluid distributors may be realized in the form of gravity distributors or nozzle-type distributors.

The disadvantage of such columns lie in relatively high packing heights that result in significant pressure losses. If dust particles are present in the gas flow, the columns can only be operated with high maintenance costs because the packings would otherwise become clogged after a short operating time and the pressure loss would become excessively high.

The cleaning of gases without a gas pressure loss cannot, in principle, be realized because the required high mass transfer coefficients can only be achieved at high relative speeds between the gas and the washing fluid. When using liquid jet pumps, a pressure loss does not occur and adequate mass transfer coefficients are achieved. However, these pumps are not suitable for cleaning gases because the dwell time of the gas in the washing fluid is not sufficient for realizing an adequate absorption. An elongation of the jet pump does not improve these circumstances because large fluid drops are formed and the relative speed between the gas and the fluid simultaneously drops. Both effects are disadvantageous with respect to the absorption efficiency.

SUMMARY OF THE INVENTION AND ADVANTAGES

The invention is based on the objective of disclosing a scrubber and a method for cleaning gases containing particulate and/or gaseous impurities, in which the gases are conveyed through at least one absorption column that is sprayed with a washing fluid, wherein said scrubber and said method make it possible to clean gases with a high dust content in a highly efficient fashion and without causing a pressure loss in the gas flow.

According to the invention, this objective is attained with a scrubber and with a method as claimed in the subject application. Advantageous additional developments of the scrubber according to the invention and the method according to the invention are disclosed in the respective dependent claims.

According to the invention, a jet pump that operates with the washing fluid is additionally provided, wherein said jet pump is arranged in the gas flow serially with the absorption column and generates a negative pressure in the gas flow. This means that the advantages of conventional absorption columns are combined with those of a liquid jet pump for the gas cleaning process. The absorption effect of the jet pump is added to that of the absorption column, and the negative pressure generated in the jet pump compensates for the pressure loss in the absorption column or may even cause a pressure gain.

It is advantageous to arrange the jet pump in the gas flow upstream of the absorption column such that the jet pump removes the majority of dust particles from the gas flow and a gas that is largely free of dust is fed to the absorption column.

The scrubber preferably contains a guide tube for the mixture of the gases and the washing fluid emerging from the jet pump, wherein said guide tube is concentrically surrounded by the absorption column. In this case, the guide tube preferably has a double casing of two concentric cylinders, between which the washing fluid can be supplied to the jet pump. In addition, the guide tube is provided with at least one lateral outlet for supplying the washing fluid to at least one spray nozzle of the absorption column. It is also advantageous that the gas flow be deflected by approximately 180° on the opposite end of the guide tube referred to the jet pump, and that a collection chamber for the impurity-laden washing fluid emerging from the guide tube and from the absorption column be arranged underneath this end. This results in a scrubber with a compact and simple design which is characterized by a small space requirement and low investment costs.

The jet pump makes it possible to generate a negative pressure on the order of 20–40 mbar, and the pressure loss in the absorption column can be maintained below 20 mbar. The negative pressure generated in the gas flow can be adjusted to a desired value by varying the quantity of washing fluid conveyed through the jet pump. In order to achieve an efficient gas cleaning, the quantitative proportion between the washing fluid conveyed through the jet pump and the washing fluid conveyed through the absorption column should lie at approximately 2:1.

BRIEF DESCRIPTION OF THE DRAWINGS

The invention is described in greater detail below with reference to one embodiment that is illustrated in the figure:

FIG. 1 shows a vertical section through a washer according to the invention.

DETAILED DESCRIPTION OF THE INVENTION

The scrubber has a cylindrical housing 1 that is closed on the respective end faces with a bottom 2 and with a cover 3. A gas inlet 4 and a gas outlet 5 are arranged opposite one another on the upper end of the housing 1. The gas inlet 4 leads through the wall of the housing and into a guide tube 6 that extends in the longitudinal direction of the housing 1. The gas outlet 5 begins in the wall of the housing 1.

The guide tube 6 consists of two cylinders that lie concentric to one another and to the housing 1 and that form a double casing with a hollow space situated in between. The guide tube 6 is closed on the upper end and open on the lower end. The hollow space between the two cylinders of the guide tube 6 is closed on the lower end and leads into the nozzles of a liquid jet pump 7 on the upper end.

The hollow space of the double casing of the guide tube 6 is connected to a supply line 9 for washing fluid on the lower end by means of a connection piece 8. The washing fluid that is subjected to a pressure of approximately 3–4 bar rises in the double casing and emerges from the nozzles of the liquid jet pump 7. These nozzles are provided in such a number and arrangement that a largely uniform spraying is achieved over the cross section of the guide tube 6.

The guide tube 6 is concentrically surrounded by several annular packing baskets 10 that respectively extend over the distance between the double casing and the wall of the housing 1. The packing baskets 10 are spaced apart from one another by the same distance and form an absorption column. It is preferred to circumferentially distribute several spray nozzles 11 above each packing basket such that said spray nozzles ensure a uniform spraying of the entire surface of the respective packing basket 10. The spray nozzles 11 are connected to the hollow space of the double casing of the guide tube 6 such that the packings can be sprayed with the washing fluid.

A mist collector 12 is situated above the absorption column, and another spray nozzle arrangement 13 is provided above the mist collector. This spray nozzle arrangement sprays water on the mist collector 12 in order to clean the mist collector within the required time intervals.

During the operation of the scrubber, the gas to be cleaned is introduced into the upper end of the guide tube 6 via the gas inlet 4. The washing fluid emerges from the nozzles of the liquid jet pump 7 under a pressure of 3–4 bar and generates a negative pressure of approximately 20–40 mbar in the guide tube 6. This negative pressure serves for taking in the gas and for mixing the gas with the washing fluid. The negative pressure can be adjusted within certain limits by accordingly varying the quantity of washing fluid that emerges from the liquid jet pump 7 per time unit. The gas/washing fluid mixture descends in the guide tube 6, wherein the washing fluid absorbs and, if applicable, converts part of the gaseous impurities such that a chemical equilibrium is adjusted. After passing baffle plates 14 that favorably affect the dedusting, the mixture emerges from the lower end of the guide tube 6 and segregates again, wherein the washing fluid with absorbed impurities and the majority of the dust settles in a collection chamber 15 that is situated in the housing 1 underneath the guide tube 6. The gas with yet unabsorbed impurities and residual dust is deflected by 180° and rises between the double casing of the guide tube 6 and the wall of the housing 1 such that it flows through the packing baskets 10 of the absorption column.

The gas is once again brought in intimate contact with the washing fluid emerging from the spray nozzles 11 in the packing baskets 10 such that the remaining gaseous impurities are absorbed and the residual dust is separated by gravity, wherein the impurities and the dust are transported into the collection chamber 15 with the washing fluid. Drops of the washing fluid which may be entrained by the gas are removed in the mist collector 12 and the cleaned gas is discharged through the gas outlet 5.

The gas pressure loss that occurs while the gas flows through the packing baskets 10 can be maintained well below 20 mbar. This means that the pressure loss is lower than the negative pressure generated by the liquid jet pump 7. This enables the scrubber to actually take in the gas to be cleaned.

The collection chamber 15 is provided with a level monitoring device such that it can be emptied via a line 16 once a predetermined quantity of washing fluid has accumulated.

After the washing fluid is treated, it can be supplied to the scrubber once again via the line 6 in the form of fresh washing fluid.

The manufacturing costs for the scrubber are comparatively low because all fluid-conducting conduits outside the housing 1 are eliminated. This makes it possible to install the absorption column without an additional steel structure. Conduit forces are uniformly distributed over the cover 3. It is also no longer necessary to reinforce the material of the housing wall in order to absorb possible mounting forces. Complicated constructions for suspending the spray nozzles 11 can be eliminated because the spray nozzles are directly attached onto the guide tube 6.

Maintenance work can also be carried out in an extremely efficient fashion. For this purpose, the housing flange 17 at the head of the absorption column is opened, the connection 18 between the connection piece 8 and the supply tube 9 is separated and the entire inner part is then upwardly pulled out of the housing 1 by means of a suitable lever device.

The invention claimed is:

1. A washer for cleaning gases that contain particulate and/or gaseous impurities, wherein a gas stream is conveyed along a gas pathway through at least one packing basket (10) that is sprayed with washing fluid with a spray nozzle (11), characterized by the fact that a jet pump (7) is additionally provided which sprays washing fluid, wherein said jet pump is arranged along said gas pathway serially with said packing basket (10) and generates a negative pressure urging said gas stream along said gas pathway and by the fact that a guide tube (6) is concentrically surrounded by said packing basket (10) for mixing the gas stream and the washing fluid emerging from said jet pump (7) and a gas inlet (4) and a gas outlet (5) are disposed adjacent the same end of the guide tube (6).

2. The washer according to claim 1, characterized by the fact that said jet pump (7) is arranged along said gas pathway upstream of said packing basket (10).

3. The washer according to claim 1 characterized by the fact that gas said gas stream and the washing fluid move in substantially the same direction adjacent the jet pump (7) and move in substantially opposite directions adjacent the spray nozzle (11).

4. The washer according to claim 1, characterized by the fact that the said guide tube (6) has a double casing consisting of two concentric cylinders, between which the washing fluid is supplied to said jet pump (7), and by the fact that the said guide tube (6) is provided with at least one lateral outlet for supplying the washing fluid to said spray nozzle (11).

5. The washer according to claim 1, characterized by the fact that said gas pathway turns 180° at an end of said guide tube (6) opposite said jet pump (7).

6. The washer according to claim 1, characterized by the fact that a collection chamber (15) for washing fluid is at an end of the guide tube (6) opposite said jet pump (7).

7. The washer according to claim 1, characterized by the fact that baffle plates (14) for boosting dust separation are provided in the guide tube (6), at an end of the guide tube (6) opposite said jet pump (7).

8. A washer for cleaning gases that contain particulate and/or gaseous impurities comprising:

a cylindrical housing (1) having a bottom (2) and a cover (3) and an inlet (4) and an outlet (5) wherein said bottom (2) and said cover (3) are disposed at opposite ends of said housing (1) and said inlet (4) and said outlet (5) are disposed adjacent said cover (3);

a guide tube (6) having an outer cylinder and an inner cylinder concentrically disposed with respect to one another and concentrically disposed in said cylindrical housing (1) wherein said inner cylinder defining a first portion of a fluid pathway communicating with said inlet (4) and said outer cylinder and said cylindrical housing (1) defining a second portion of said fluid pathway communicating with said outlet (5) and said inner and outer cylinders defining a washing fluid pathway sealed from said first and second portions and extending substantially between said bottom (2) and said cover (3);

a first line (9) piercing said cylindrical housing (1) and directing washing fluid to said washing fluid pathway;

a pump (7) disposed downstream of said inlet (4) adjacent said cover (3) and receiving washing fluid from said washing fluid pathway and directing washing fluid along said first portion and toward said outlet (5);

a packing basket (10) disposed along said second portion; and a spray nozzle (11) disposed between said outer cylinder and said cylindrical housing (1) and downstream of said packing basket (10) and receiving washing fluid from said washing fluid pathway and directing washing fluid to said packing basket (10).

9. The washer according to claim 8 including a collection chamber (15) disposed adjacent said bottom (2) and in fluid communication with said first and second portions.

10. The washer according to claim 9 including a mist collector (12) concentrically disposed around said outer cylinder and positioned along said second portion downstream of said packing basket (10).

11. The washer according to claim 10 including a spray nozzle (13) disposed along said second portion between said outlet (5) and said mist collector (12) and communicating with said washing fluid pathway and directing washing fluid to said mist collector (12).

* * * * *

UNITED STATES PATENT AND TRADEMARK OFFICE
CERTIFICATE OF CORRECTION

PATENT NO. : 7,101,425 B2
APPLICATION NO. : 10/474109
DATED : September 5, 2006
INVENTOR(S) : Gunter H. Kiss It is certified that error appears in the above-identified patent and that said Letters Patent is hereby corrected as shown below:

Column 4, Line 27: after "said jet pump", please insert --(7)--.

Column 4, Line 32: after "mixing", delete "the" and insert--said--.

Column 4, Line 34: after "end of", delete "the" and insert--said--.

Column 4, Line 39: after "claim 1", please insert --,--.

Column 4, Line 40: after "fact that", delete "gas".

Column 4, Line 41: after "adjacent", delete "the" and insert -- said--.

Column 4, Line 42: after "adjacent", delete "the" and insert--said --.

Column 4, Line 56: after "end of", delete "the" and insert --said--.

Column 4, Line 59: after "provided in", delete "the" and insert --said --.

Column 4, Line 59: after "end of", delete "the" and insert -- said --.

Signed and Sealed this

Sixth Day of February, 2007

JON W. DUDAS
*Director of the United States Patent and Trademark Office*